United States Patent
Steelman et al.

(10) Patent No.: US 10,708,290 B2
(45) Date of Patent: *Jul. 7, 2020

(54) SYSTEM AND METHOD FOR PREDICTION OF FUTURE THREAT ACTIONS

(71) Applicant: SecureWorks Corp., Wilmington, DE (US)

(72) Inventors: Doug M. Steelman, Woodstock, GA (US); Todd Wiedman, Acworth, GA (US); Kenneth A. Deitz, Atlanta, GA (US); Berlene Herren, Fairburn, GA (US); Edgar L. Deal, Gainsville, GA (US); Thomas Clements, Kennesaw, GA (US); Brian Miller, Woodstock, GA (US)

(73) Assignee: SecureWorks Corp., Wilmington, DE (US)

( * ) Notice: Subject to any disclaimer, the term of this patent is extended or adjusted under 35 U.S.C. 154(b) by 317 days.

This patent is subject to a terminal disclaimer.

(21) Appl. No.: 14/997,763

(22) Filed: Jan. 18, 2016

(65) Prior Publication Data

US 2017/0208085 A1 Jul. 20, 2017

(51) Int. Cl.
| | |
|---|---|
| *H04L 29/06* | (2006.01) |
| *G06N 20/00* | (2019.01) |
| *G06N 3/04* | (2006.01) |
| *G06N 3/08* | (2006.01) |

(52) U.S. Cl.
CPC ....... *H04L 63/1433* (2013.01); *G06N 3/0445* (2013.01); *G06N 3/0454* (2013.01); *G06N 20/00* (2019.01); *H04L 63/0209* (2013.01); *H04L 63/1491* (2013.01); *G06N 3/08* (2013.01); *H04L 63/1441* (2013.01)

(58) Field of Classification Search
CPC .................................................. H04L 63/1433
See application file for complete search history.

(56) References Cited

U.S. PATENT DOCUMENTS

| | | | | |
|---|---|---|---|---|
| 2010/0332889 | A1* | 12/2010 | Shneorson | G06Q 10/04 714/2 |
| 2012/0072983 | A1* | 3/2012 | McCusker | H04L 63/126 726/22 |
| 2014/0200953 | A1* | 7/2014 | Mun | G06Q 10/04 705/7.28 |
| 2016/0164905 | A1* | 6/2016 | Pinney Wood | G06F 17/30958 726/25 |
| 2016/0226905 | A1* | 8/2016 | Baikalov | H04L 63/1433 |

* cited by examiner

*Primary Examiner* — William S Powers
(74) *Attorney, Agent, or Firm* — Larson Newman, LLP

(57) ABSTRACT

An information handling system performs a method for analyzing attacks against a networked system of information handling systems. The method includes detecting a threat indicator, representing the threat indicator in part by numerical parameters, normalizing the numerical parameters, calculating one or more measures of association between the threat indicator and other threat indicators, finding an association of the threat indicator with another threat indicator based upon the normalized numerical parameters, and assigning to the threat indicator a probability that a threat actor group caused the attack, wherein the threat actor group was assigned to the other threat indicator.

18 Claims, 7 Drawing Sheets

SYSTEM AND METHOD FOR PREDICTION OF FUTURE THREAT ACTIONS

CROSS REFERENCE TO RELATED APPLICATIONS

Related subject matter is contained in co-pending U.S. patent application Ser. No. 14/997,761 entitled "System and Method for Attribution of Actors to Indicators of Threats to a Computer System and Prediction of Future Threat Actions," filed of even date herewith, the disclosure of which is hereby incorporated by reference.

FIELD OF THE DISCLOSURE

The present disclosure generally relates to a system and method for responding to threats to information handling systems, and relates more particularly to a system and method for attributing threat actors to threat indicators and for predicting future attacks.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination. One or more information handling systems connected over one or more networks may respond to security threats.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
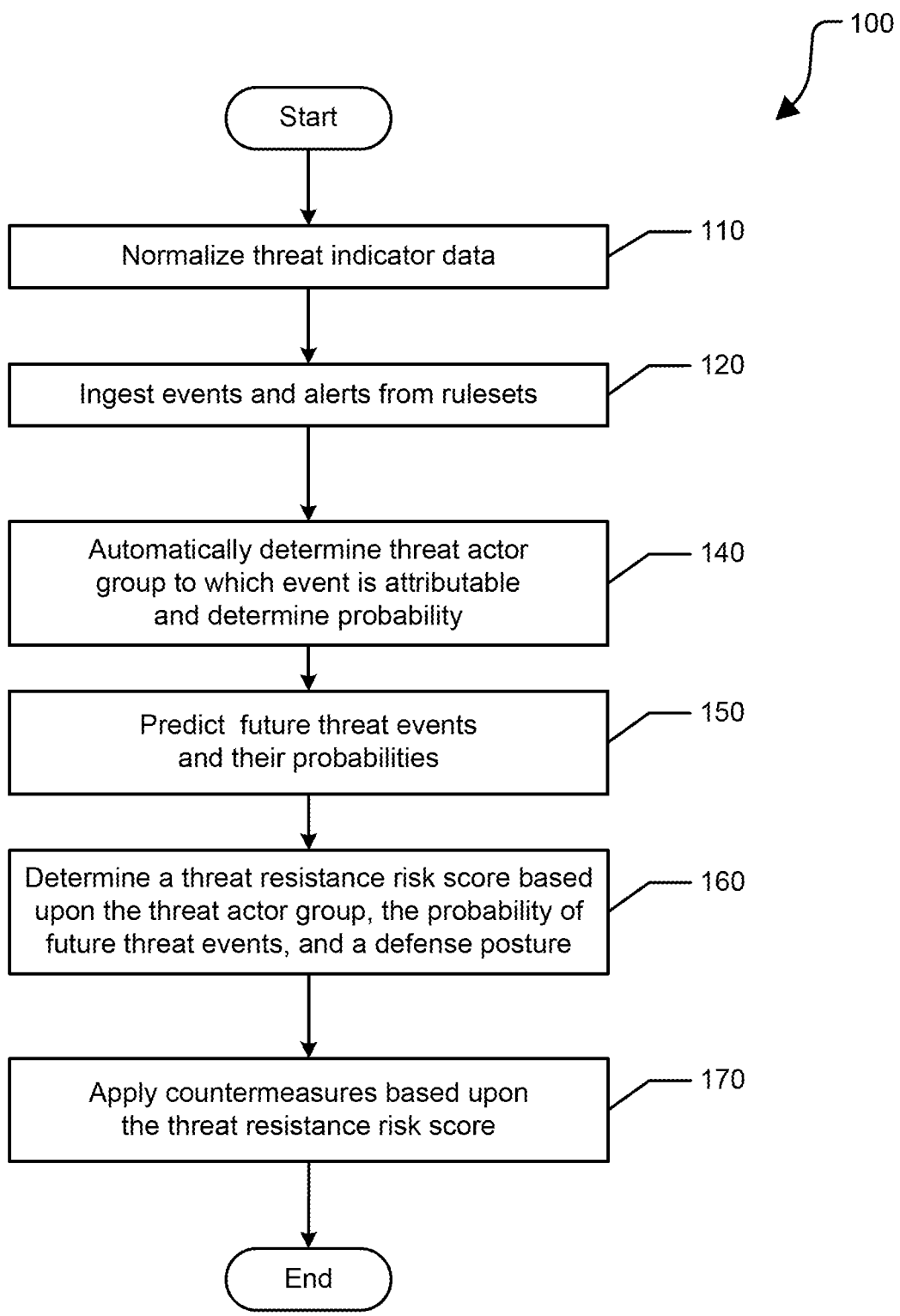
FIG. 1 is a flow diagram of a method for responding to security threats to an information handling system.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

An information handling system may respond to attacks on a networked system of information handling systems. The information handling system may detect a threat indicator, represent the threat indicator in part by numerical parameters, normalize the numerical parameters, calculate one or more measures of association between the threat indicator and other threat indicators, find an association of the threat indicator with another threat indicator based upon the normalized numerical parameters, and assign to the threat indicator a probability that a threat actor group caused the attack, wherein the threat actor group was assigned to the other threat indicator. In some embodiments, the normalizing may include transforming a distribution of the numerical parameters to a distribution with a standard deviation of 1 and a mean of 0. In some embodiments, the normalizing may include applying an empirical cumulative distribution function. In some embodiments, the one or more measures of association between the threat indicator and other threat indicators may include a Kendall's tau between the threat indicator and the other threat indicators, a covariance between the threat indicator and the other threat indicators, or a conditional entropy between the threat indicator and the other threat indicators.

The information handling system may also predict future attacks on the networked system of information handling systems based upon the threat actor group assigned to the threat indicator and may determine a probability of the future attacks. The information handling system may also determine a threat resistance score risk based upon the threat actor groups, the probability of future threat events, and the defense posture of the networked system. In addition, the information handling system may apply countermeasures based upon the threat resistance score to the networked system.

FIG. 1 illustrates a method 100 for responding to security threats. At block 110, threat indicator data is normalized. Threat indicator data is data about potential threats to a system of information handling systems. The data may include data about anomalous or suspicious behavior, such as network communications from a suspicious source, data about attempts to communication with the system in a non-standard way, and data about particular attacks on the system, such as malware attacks, physical attacks, phishing campaigns, web attacks, and denial of service attacks. The data may describe the mechanisms of the attack, the frequencies of the attack, threat actor groups associated with the attack, sources of information about the attack, and other information about the attack. Threat indicator data may also include data from analysts about attacks on computer systems. A threat actor group is one or more actors who combine in a computer attack. The actors may be people or organizations. Attributes of actors include superiors, peers, subordinates, tools and tactics used, and industries targeted.

Figure 2A:
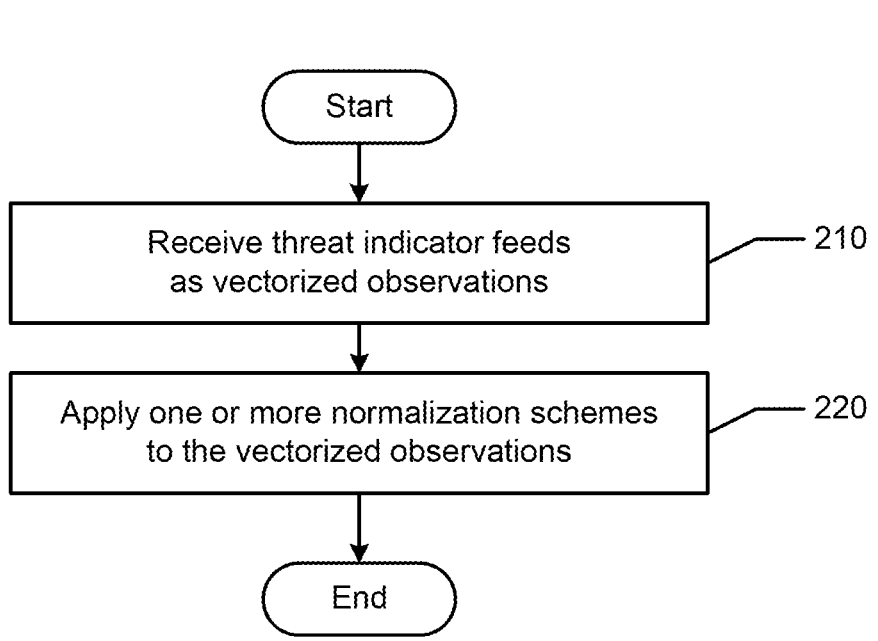
FIG. 2A is a flow diagram of a method to normalize threat indicator data.

Turning to FIG. 2A, illustrated is a method 200 of normalizing threat indicator data. At block 210, the threat indicator data is received as vectorized observations. The vectors may be generated by selecting a number p of network features or variables and determining the values of the features or variables at each of a number T of discrete time interval observations. Thus, a set of observations at a discrete time interval may be represented by a p-dimensional vector. These values may be ingested and represented by a p×T multivariate vector X, which may have p columns in each of t=1, . . . ,T discrete time steps slices or slices. This vector X may be input to a normalization scheme.

At block 220, one or more normalization schemes may be applied to the vectorized observations. Normalizing the data may place the values of each feature or observation into comparable ranges. In many embodiments, a normalization scheme may include a monotonic function on one or more sets of the values. A monotonic function is a function which is either entirely nonincreasing or nondecreasing. In further embodiments, the function may map the values to the range [0, 1]. In some embodiments, a normalization scheme may be a function $$Z=z(X):R^p \rightarrow R^p$$

In these embodiments, the normalization scheme Z preserves the dimensions of the incoming data. In further embodiments, the function $z(\bullet)$ may be one of the following functions:

a.

$$z(X) = \sqrt{\frac{X - \overline{X}}{\text{var}(X)}},$$

where var is the vector sample variance and $\overline{X}$ is the mean. Where an underlying distribution for a finite sequence of values $x_i$ is not known, a sample variance $S_N^2$ may be calculated by the formula $$S_N^2 = \frac{1}{N}\sum_{i=1}^{N}(x_i - \overline{x})^2$$

Use of this formula may generate data with a mean of zero and variance of one.

b. $z(X)=F_n(X)$ where $F_n(\bullet)$ is the empirical cumulative distribution function (ECDF). ECDF (x) is the proportion of X values less than or equal to x. This function generates values between 0 and 1. In other embodiments, normalization schemes may include other functions on the values of the features or observations.

Returning to FIG. 1, at block 120, events and alerts from rulesets are ingested. An event may represent an element of an attack against a computer network. An event may be generated from a threat indicator by adding attributes. In some embodiments, events may conform to the diamond model of computer attacks. Under the model, an intrusion activity is composed of events with four core features: adversary, infrastructure, capability, and victim. An event may represent a step in a series of steps that an adversary must execute to achieve an objective. To create an event conforming to the diamond model from a threat indicator, a threat actor group and its capability may be assigned to the threat indicator as an adversary and a capability of the event.

Figure 2B:
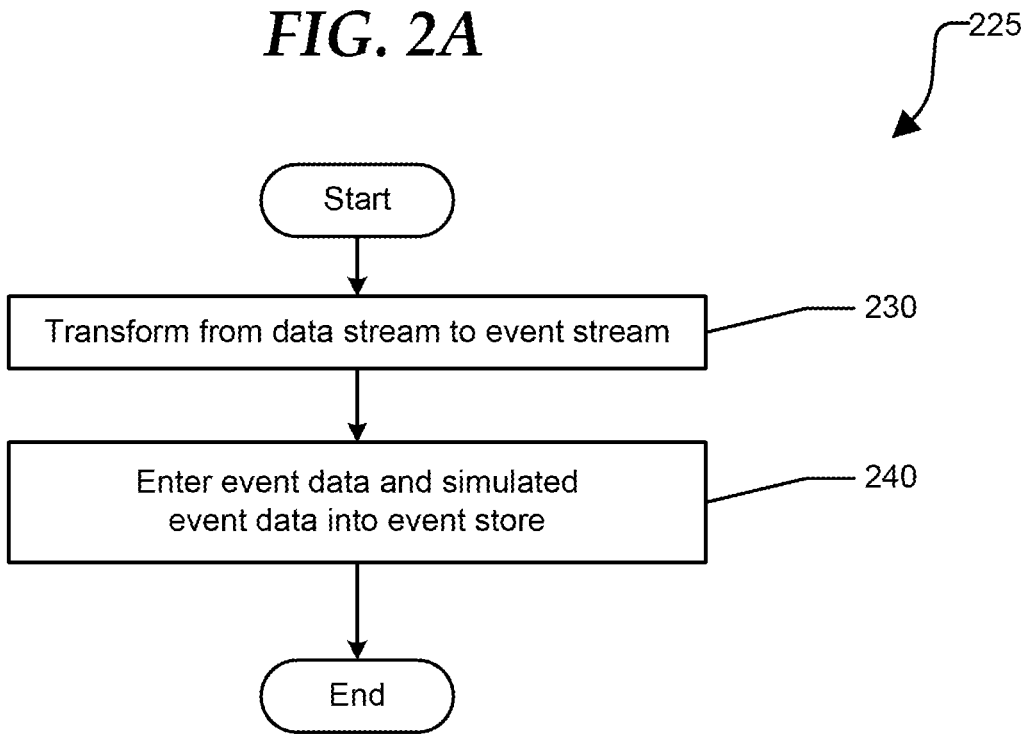
FIG. 2B is a flow diagram of a method to ingest events and alerts from rulesets.

The process 225 of ingesting events and alerts from rulesets is illustrated by FIG. 2B. At block 230, the stream of data is transformed into a stream of events. The transformation may be performed by computer security experts who generate events from the incoming, normalized data stream. The expert may analyze threat indicators and create countermeasures (rules or signatures) that may be placed on security tools to detect and block threats and alert when they are detected. The application of the rules to the data stream may generate threat indicators. As an example, a rule may designate an IP address as dangerous. Incoming data may indicate that a system user visited the site. As a result, a threat indicator describing the visit to the site would be generated. An event may then be generated from the threat indicator. The generation of event data from the data of the data stream may be represented by a function Y=Y(X), where Y: $R^p \rightarrow R^q$ with q≤p.

At block 240, the event data is entered into an event store. An event store is a portion of one or more memories used to store events. The event store may normalize the events and may add additional information to the events. In addition, the event store may receive data about simulated events. A computer security system may, for example, create honeypots. Data produced from the honeypots may be added to the event store. A honeypot is a trap set to counteract attempts at unauthorized access to information systems. A honeypot consists of a node which is apparently a part of a network under attack and may contain a resource of value to attackers. The node is actually isolated and monitored. Attacks on the honeypot may deflect attacks elsewhere. They may also protect other networks by gathering information about the attackers.

Figure 3:
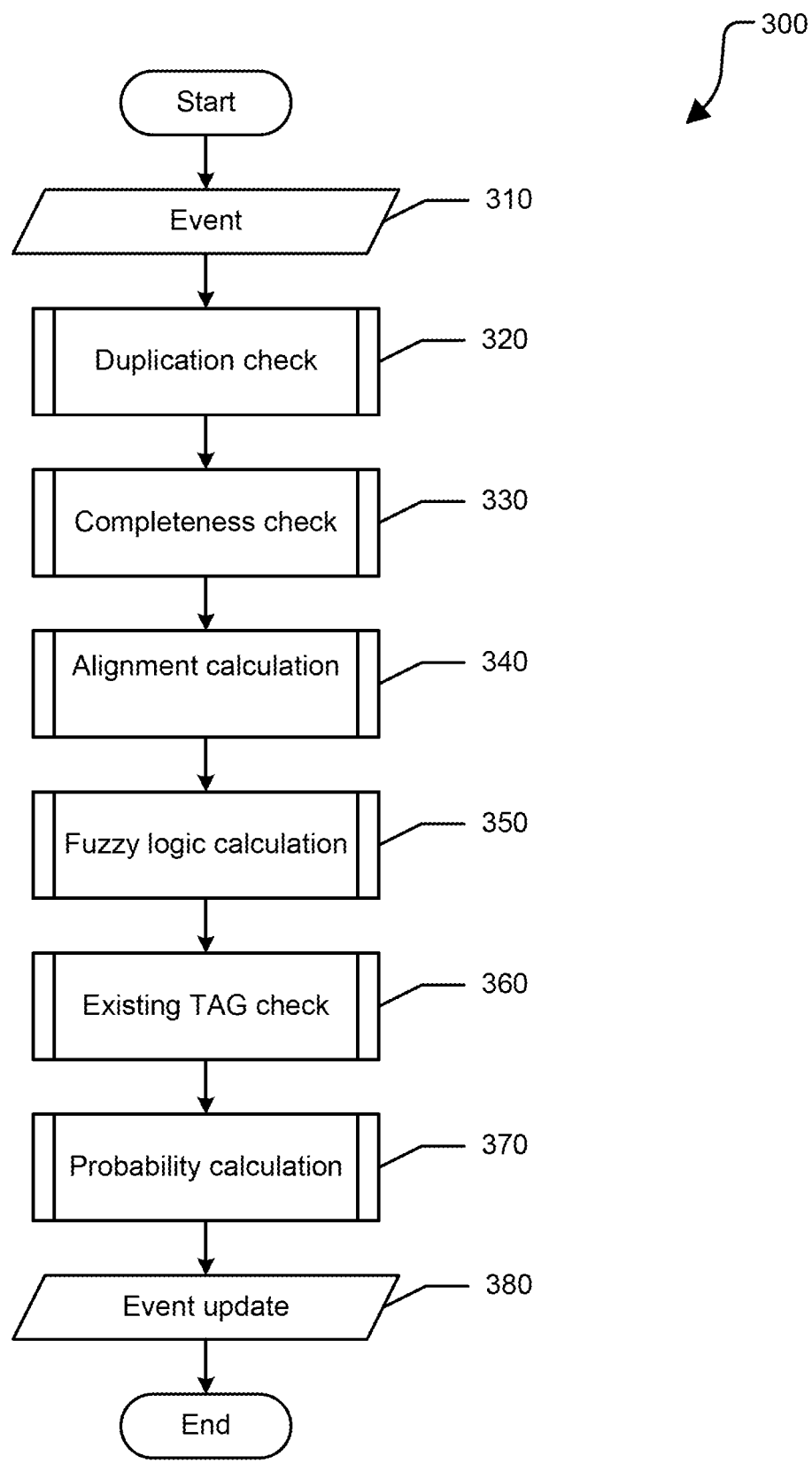
FIG. 3 is a flow diagram of a method for assigning a probability that an event related to the computer security of one or more information handling systems is attributable to a threat actor group.
Figure 4:
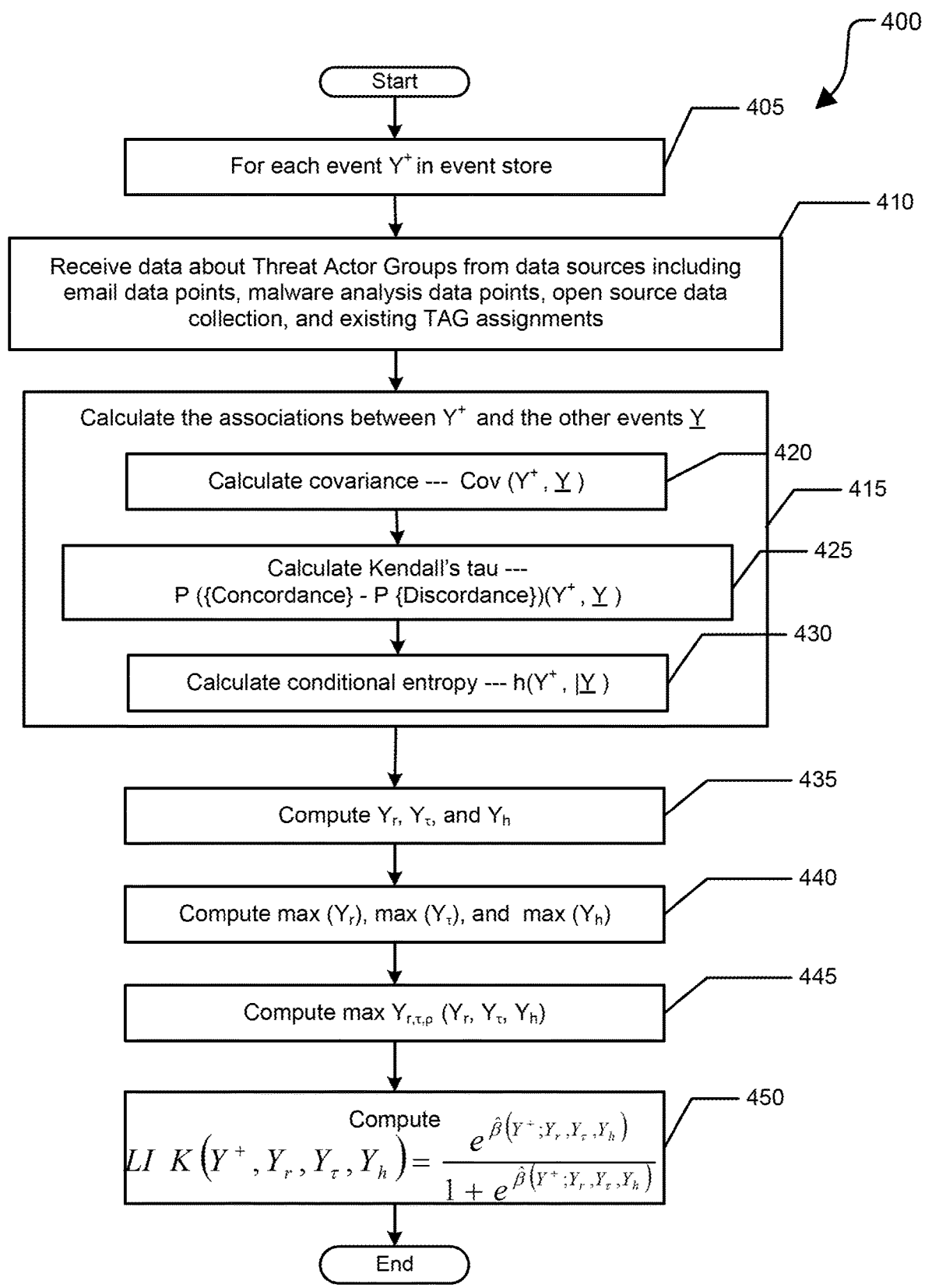
FIG. 4 is another flow diagram of a method for assigning a probability that an event related to the computer security of one or more information handling systems is attributable to a threat actor group.

Returning to FIG. 1, at block 140, a threat actor group to which an event is attributable is determined automatically. An event that represents a threat indicator is attributable to a threat actor group if the attack which produced the threat indicator was caused by the threat actor group. In addition, a probability the event is attributable to the threat actor group is determined automatically. This process is illustrated by FIGS. 3 and 4. FIG. 3 includes auxiliary processes 300 used in determining the probability. At block 310, an event from the event store is examined. At block 320, a duplication check is performed. The event store is checked for other instances of the event. At block 330, a completeness check is performed. A check is made that the appropriate data fields are filled out for the entry. At block 340, an alignment calculation is performed. At block 350, a fuzzy logic calculation is performed. Fuzzy logic is a form of logic in which variables may have values representing degrees of truth, rather than the true and false values of variables in Boolean logic.

At block 360, a check is made of existing threat actor groups. This check compares existing TAGs to TAGs assigned and if aligned associates the event appropriately. At block 370, a probability calculation is performed. The calculation determines a probability that the event is associated with a particular threat actor group. At block 380, the entry for the event in the event store is updated with the information calculated in the previous steps of FIG. 3.

FIG. 4 is a method 400 of calculating the probability that a threat actor group caused an attack. FIG. 4 may carry out the process described by block 370 of FIG. 3. For each event Y+ in an event store (block 405, the probability that the event Y+ is associated with the threat actor group is determined. At block 410, data is received on threat actor groups. The sources may include, but are not limited to, email detail points, malware analysis data points, open source data collection, and existing threat actor group's assignments. At block 415, measures of association between the event Y+ and each of the events in the event store are calculated based. At block 420, the covariance Cov (Y+, $\underline{Y}$) is calculated for each Y in the event store. The covariance between two sequences of values X and Y may be defined as $$\text{cov}(X, Y) = \sum_{i=1}^{N} \frac{(x_i - \bar{x})(y_i - \bar{y})}{N},$$

where X=Xi, Y=Yi, and $\bar{x}$ and $\bar{y}$ designate the mean of X and Y respectively.

At block 425, Kendall's tau $\tau$ is calculated between the event Y+ and each of the events in the event store. Kendall's $\tau$ is defined as $\tau = P(\{\text{Concordance}\} - \{\text{Discordance}\})[Y+, \underline{Y}]$.

$$\tau = \frac{n_c - n_d}{\frac{n(n-1)}{2}},$$

where $N_c$ is the number of concordant pairs and $N_d$ is the number of discordant pairs. A pair $(x_i, x_j)$ and $(y_i, y_j)$ of observations of X and Y is concordant if $x_i < x_j$ and $y_i < y_j$ or if $x_i > x_j$ and $y_i > y_j$. A pair $(x_i, x_j)$ and $(y_i, y_j)$ of observations of X and Y is discordant if $x_i < x_j$ and $y_i > y_j$ or if $x_i > x_j$ and $y_i < y_j$.

At block 430, the conditional entropy $h(Y^+|\underline{Y}) = h(Y^+, \underline{Y}) - h(\underline{Y})$ is calculated between the event Y+ and each of the other events in the event store for each set of data points. The conditional event of $Y^+$ given X is an amount of information needed to describe the outcome of $Y^+$ given that the value of X is known. It is the result of averaging $h(Y^+|X=x)$ over all values x of X. A formula for calculation of conditional entropy is $$H(Y \mid X) = \sum_{x \in X} p(x) H(Y \mid X = x),$$

where p(x) is the probability of the variable X taking the value x.

At block 435, for each of the three measures of associations, the values are accumulated and stored. Designate by $Y_r$ a list of the covariance values between Y+ and each of the other events in the event store, by $Y_\tau$ a list of the Kendall's tau values between Y+ and each of the other events in the event store, and by $Y_h$ a list of the conditional entropy values between Y+ and each of the other events in the event store. At block 440, the maximum value of each list is calculated—max $(Y_r)$, max $(Y_\tau)$, and max $(Y_h)$. At block 445, max $Y_{r,\tau,\rho}(Y_r, Y_\tau, Y_h)$ is calculated. This is the maximum association value of any of the three types between $Y^+$ and any other event in the event store. In other embodiments, other methods of finding a maximal association between Y+ and the other events in the event store may be found based upon a combination of the values of the three types of associations. For example, a function f of three variables may be selected, and the event X may be selected to maximize f(Cov (Y, X), $\tau$(Y, X), H(Y|X)).

At block 450, the probability that event $Y^+$ is attributed to a particular threat actor group, LI K, is calculated by the formula:

$$LIK(Y^+, Y_r, Y_\tau, Y_h) = \frac{e^{\hat{\beta}(Y^+; Y_r, Y_\tau, Y_h)}}{1 + e^{\hat{\beta}(Y^+; Y_r, Y_\tau, Y_h)}}$$

$\hat{\beta}$ is the estimator of the statistical relationship between the measurements for the threat actor and similar events in the data repository. This is a parameterization for the model between the predictors—events in the repository and new measurements from the threat actor—and the probability that a new event is an actual threat. Some of the inputs to $\hat{\beta}$ may be obtained from the vectorized observations received in block 210 of FIG. 2A. In some embodiments, the model $\hat{\beta}$ represents a statistical model (logit, probit, etc.) to indicate a relationship between predictors and the probability that a threat will occur. The models may use similar inputs.

The observations may include data about anomalous behavior, such as network communications from a suspicious source, data about attempts to communicate with the system in a non-standard way, and data about particular attacks on the system. The data about an event may include a timestamp, a confidence value, and a classification. The data may include data from analysts about attacks on computer systems.

In particular, the data may indicate the type of attack—whether an event is a physical attack, web attack, email attack, phish campaigns, denial of service attacks, or other attack; the method of the attack; the expenditure of resources involved in the attack; the sources of intelligence on the attack; and the degree of confidence in the data about the attack. Information about a web attack may include information about a targeting server and targeted server and about the number of instances of the attack. Information about a physical attack may include the attack type. Data about malware used in an attack may include data about files used in the attack, such as an MD5 or SHA256 hash or Yara signature; information about API calls such a function being called, a name of a DLL of a function called, and URLs contained in the call; data about hits on the malware from anti-virus programs; a persistence method of the malware for remaining in a computer, and a registry key entry used by the malware. Data about attacks may include data about network locations, such as IP address, domain name, access credentials, service port, and servers involved in the attack.

In many embodiments, a search of events which may have been generated by the same threat actor groups can be directed to either the extremal 3-tuples for the join of the list measures of association or the extrema within each list-wise measure of association. The extremal 3-tuples are those other events which are most similar to the event under consideration in all three measures of association. The extrema within each list-wise measure are those other events which are most similar in one of the three measures of association. In other embodiments, other methods of attributing actors to event may be executed.

Returning to FIG. 1, at block 150, future threat events and their probability are predicted. The process may involve detecting sequences of events from particular threat actor groups. Then, if an initial subsequence of one of the detected sequences occurs, the process may predict with a certain probability that the actions of the remainder of the sequence will occur, unless specific countermeasures are taken. In addition, future campaigns similar to a current campaign might be predicted. From a threat indicator indicative of a phishing attack on a certain computer network, a future phishing attack on a related network might be predicted.

Figure 5:
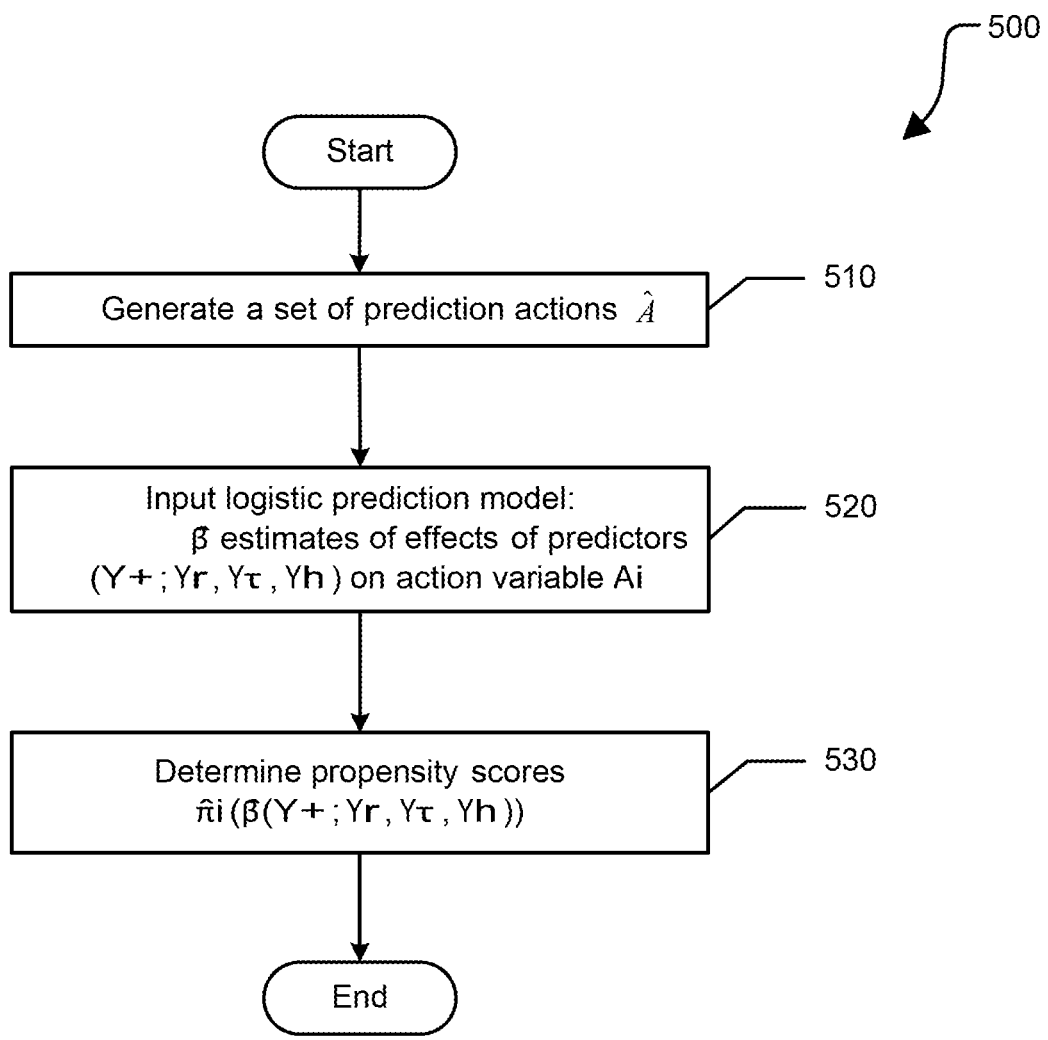
FIG. 5 is a flow diagram of a method of determining potential future threat events to computer security and for assigning probabilities to the future threat events.

FIG. 5 is a method 500 of generating possible future attacks and determining their probability. Method 500 may carry out the process of block 150. At block 510, as a new event $Y^+$ is created, a set of potential actions $\hat{A}$ is generated based upon the event $Y^+$. In some embodiments, the set $\hat{A}$ may be generated by selecting cases/observations/days similar to the event $Y^+$ from the historical data, based upon a model in use, and generating a set of predictions from the similar cases. In particular, the set $\hat{A}$ may be generated in part By knowledge of the threat actor group assigned to event $Y^+$ in block 140 of FIG. 1 and in FIG. 4.

At block 520, an input prediction model $\hat{\beta}$ is input. $\hat{\beta}$ may describe a relationship between predictors and a probability that one of the set of actions $\hat{A}$ will be taken. The predictors may include any variables assigned to incoming events for which measurements are determined. The predictors may be the same or similar to those used to assign actors to events at block 450 above. In statistical terminology the parameter $\beta$ is the true relationship (function, etc.) between the measurements on an possible threat event and the true probability that the event is an actual threat. $\hat{\beta}$, on the other hand, is the statistical estimator for this relationship: estimated from the measurements on the current (threat) event and on statistically similar events in the event repository. In the embodiment of FIG. 5, the model $\hat{\beta}$ uses the variables $Y_r$, $Y_\tau$, $Y_h$ as defined in the discussion of FIG. 4 and defines a relationship between an event $Y^+$ and those variables; hence, the designation of the model $\hat{\beta}$ by $\hat{\beta}$ ($Y^+$; $Y_r$, $Y_\tau$, $Y_h$). $\hat{\beta}$ may also utilize the variables max ($Y_r$), max ($Y_\tau$), max ($Y_h$), and max $Y_{r,\tau,\rho}(Y_r, Y_\tau, Y_h)$.

In some embodiments, $\hat{\beta}$ may be calculated by using logistic or probit regression. Logistic regression may determine a relationship between a variable which is either true of false (dichotomous variable) and independent variables by calculating a log odds ratio that the dichotomous variable is true as a linear sum of the independent variables. The log odds ratio that an action $A_i$ is a success may be defined as $$\log\left(\frac{P(A_i = 1)}{P(A_i = 0)}\right) = \log\left(\frac{\pi_i}{1 - \pi_i}\right)$$

where $P(A_i=1)=\pi_i$ is the probability that action $A_i$ is a success. Probit regression determines a normal distribution involving the dependent variable as a linear sum of the independent variables.

At block 530, the propensity scores $\hat{\pi}_i(\hat{\beta}(Y^+; Y_r, Y_\tau, Y_h))$ are determined. A propensity score $\hat{\pi}_i$ for the event $Y^+$ is the predicted probability that the ith generated action $A_i$ will be undertaken. The score is determined by applying the model $\hat{\beta}$ to the values of the variables (predictors) for the event Y under consideration.

Returning to FIG. 1, at block 160, a threat resistance risk score for a computer network system is determined. The threat resistance risk score represents a vulnerability of the system to attacks from the threat actor groups. In some embodiments, the score may be on the same scale as scores obtained by use of the Common Vulnerability Scoring System (CVSS). CVSS is an industry standard for assessing the severity of computer system security vulnerabilities.

The threat resistance risk score may be based upon the threat actor groups which may attack a computer network system, the probability of future events, a defense posture of the computer network system under consideration, and a vulnerability criticality rating. The defense posture indicates measures in effect to protect the computer network system. The vulnerability criticality rating may indicate a criticality score for a vulnerability to threats. The criticality score may provide a measure of how much harm may be caused by a particular vulnerability. In some embodiments, vulnerability criticality rating may be determined dynamically. Some of the parameters used in its determination may be measured continually or periodically rather than only once. Data used to determine the threat resistance risk score may include data from the event store and may include selected data obtained from multiple security tools protecting the computer network system.

At block 170, countermeasures are applied based upon the threat resistance risk score. Countermeasures may include hardware and software such as firewalls, anti-virus programs, and reconfiguration or creation of internal computer networks. They may also include adoption and enforcement of policies, such as limiting employees in visiting internet sites, warnings or prohibitions about certain kinds of emails or attachments, and more stringent log-in methods. In case the threat resistance risk score indicates no serious risk, the existing countermeasures may be continued. When security measures are attended to, a networked system of information handling systems may more reliably undertake transactions, such as sales transactions, purchase transactions, and the receipt and transmission of data.

Figure 6:
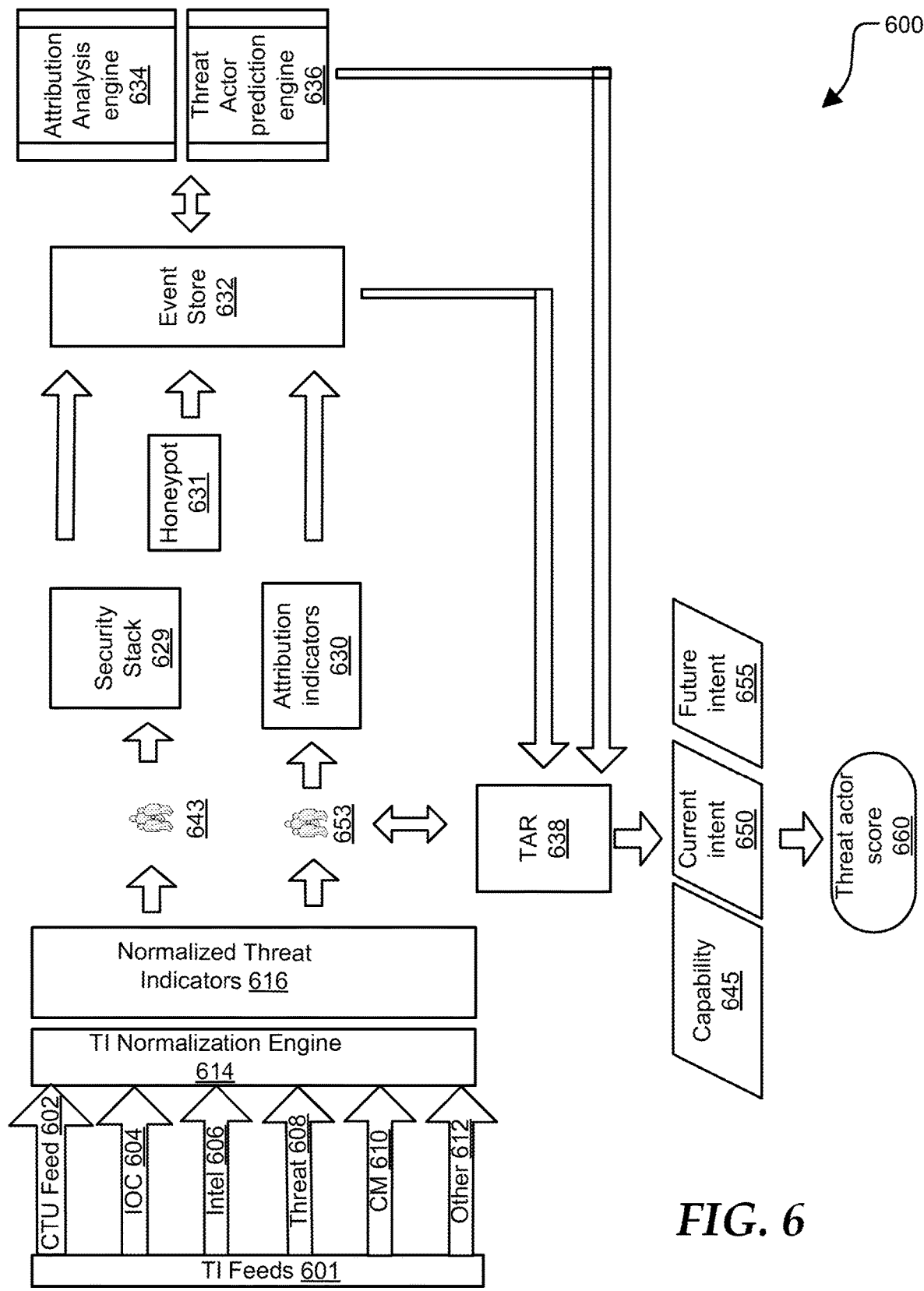
FIG. 6 is a data flow diagram of a method of attributing threats to computer security to actors and for assigning probabilities of future threat events.

FIG. 6 illustrates a data flow 600 of methods of attributing threats to computer security to actors and for assigning probabilities of future threat events. FIG. 6 includes threat indicator (TI) feeds 601, TI normalization engine 614, normalized threat indicators 616, counter measure groups 643, intelligence (Intel) teams 653, security stack 629, attribution indicators 630, honeypot 631, event store 632, attribution analysis engine 634, threat actor predictor engine 636, threat actor repository (TAR) 638, capability 645, current intent 650, and future intent 655.

TI feeds 601 collects information useful for analyzing the threats and includes data that is extracted from external and internal processes and systems that create technical threat indicators The information includes counter-threat unit (CTU) feed 602, indicators of compromise (IOC) 604, intel 606, threat 608, countermeasures feed (CM) 610, and other information 612. In many embodiments, the threat information data collected in TI feeds 601 is typically not attributed to a particular threat actor. CTU 602 includes information gathered by analysts who protect computer installations. The information includes information about current threats to this installation, threats to computers generally, threat actors, and useful countermeasures. The analysts may monitor information outlets and sources around the world to learn of new threats, new threat actor groups, and new developments with existing threat actor groups.

IOC 604 are indicators observed by a network computer system that an attack has been mounted. IOCs may include virus signatures and IP addresses, MD5 hashes of malware files or URLs or domain names of botnet command and control servers. Intel 606 may be provided by intelligence analysts. They may analyze threat indicators as well as other threat data and create threat actor groups. Threat 608 includes information about current threats to the network computer system and to threats to other computer systems that are reported by computer security analysts. Countermeasures feed 610 may be provided by countermeasure groups. These groups may analyze threat indicators and create countermeasures (rules or signatures) that can be placed on security tools to detect and block threats and alert when they are seen. Other 612 indicates threat indicator feeds from other sources and may include third party or open source threat indicator data.

The incoming threat indicator feeds are processed by TI normalization engine 614. In some embodiments, data about events may include vectorized observations. TI normalization engine 614 may apply one or more normalization schemes to the vectorized observations, as described in the discussion of element 220 of FIG. 2. The resulting normalized threat indicators 616 may be analyzed by countermeasure groups 643. They may create countermeasures that can be placed on security tools. The countermeasures may include rules or signatures. The countermeasures may detect or block threats or alert when threats are detected. These countermeasures may be placed on security stack 629.

Security stack 629 may include infrastructure to provide security to a system of networked computers. Security stack systems may monitor network and data and create events and alerts. These events/alerts may be ingested into the event store. The event store may normalize the events as well as add additional information to the events.

Security stack 629 may include a mail gateway, an intrusion prevention system (IPS), a firewall, and an intrusion detection system (IDS). An IPS may be deployed inline to block attacks. It may also log the attack and add the source IP address to the block list. The blocking may be for a limited amount of time or permanently. For example, an IPS may recognize port scans and address scans, actions typically taken by hackers, and take actions to disrupt the scans such as block, drop, quarantine, and log traffic.

A firewall is a network security system that monitors and controls incoming and outgoing network traffic based on predetermined security rules. A firewall typically establishes a barrier between a trusted, secure internal network and another outside network, such as the Internet, that is assumed to not be secure or trusted. An IDS may detect intrusions. It may log an attack and send an alert to an administrator. Unlike an IPS, however, it may not attempt to block the attack.

Intel 653 may analyze the threat indicators of normalized threat indicators 616 and may define associations between the threats/events and threat actors. The analysis may be stored in attribution indicators 630, which includes threat indicators with attribution. Data from security stack 629, attribution indicators 630, and honeypot 631 may be stored in event store 632. Events are processed threat indicators. Honey pot 631 includes data collected from honey pots.

Information about events in event store 632 passes back and forth to attribution analysis engine 634 and threat actor prediction engine 636. Attribution analysis engine 634 assigns a probable actor to threats in event store 632. In some embodiments, attribution analysis engine 634 may perform the probability calculation of FIG. 4 to determine a probability that a threat event from event store 632 is associated with a particular threat actor group. Once the probable actor is assigned to the event, the event record is updated in the event store. Attribution analysis engine 634 may communicate probable threat actor assignment with event store 632 and attribution indicators 630.

Threat actor prediction engine 636 determines a set of prediction actions (probable future event patterns) related to a threat from event store 632 and determines the probability of occurrence of these events. In some embodiments, attribution analysis engine 634 may perform the propensity score calculation of FIG. 5. Information about the predicted threats may be placed in event store 632. Threat actor prediction engine 636 may communicate probable future event patterns with threat actor repository 638 (TAR).

Threat actor repository 638 includes information about actors who may pose a threat to a computer system. The actors may be organized into groups. The information may be updated with information from events contained in event store 632 and information produced by attribution analysis engine 634 and threat actor prediction engine 636. In addition, intel 653 may utilize the information in attributing threat actors to events. The information may include information about the capability 645 of actors or groups of actors, their current intent 650, and their future intent 655. Current intent 650 of an actor or actor group may be an objective of actions currently undertaken by the actor or group. Future intent 655 of an actor or actor group may be an objective of a set of actions predicted to be performed by the actor or actor group. Threat actor score 660 measures a vulnerability of a computer system to attacks from a threat actor or group.

It may be based upon the current and predicted actions of the actor or group and the vulnerabilities of the computer system to the actions, taking into consideration countermeasures, both planned and possible. It may be determined by inputting data in the database to a model such as input prediction model $\hat{\beta}$.

Figure 7:
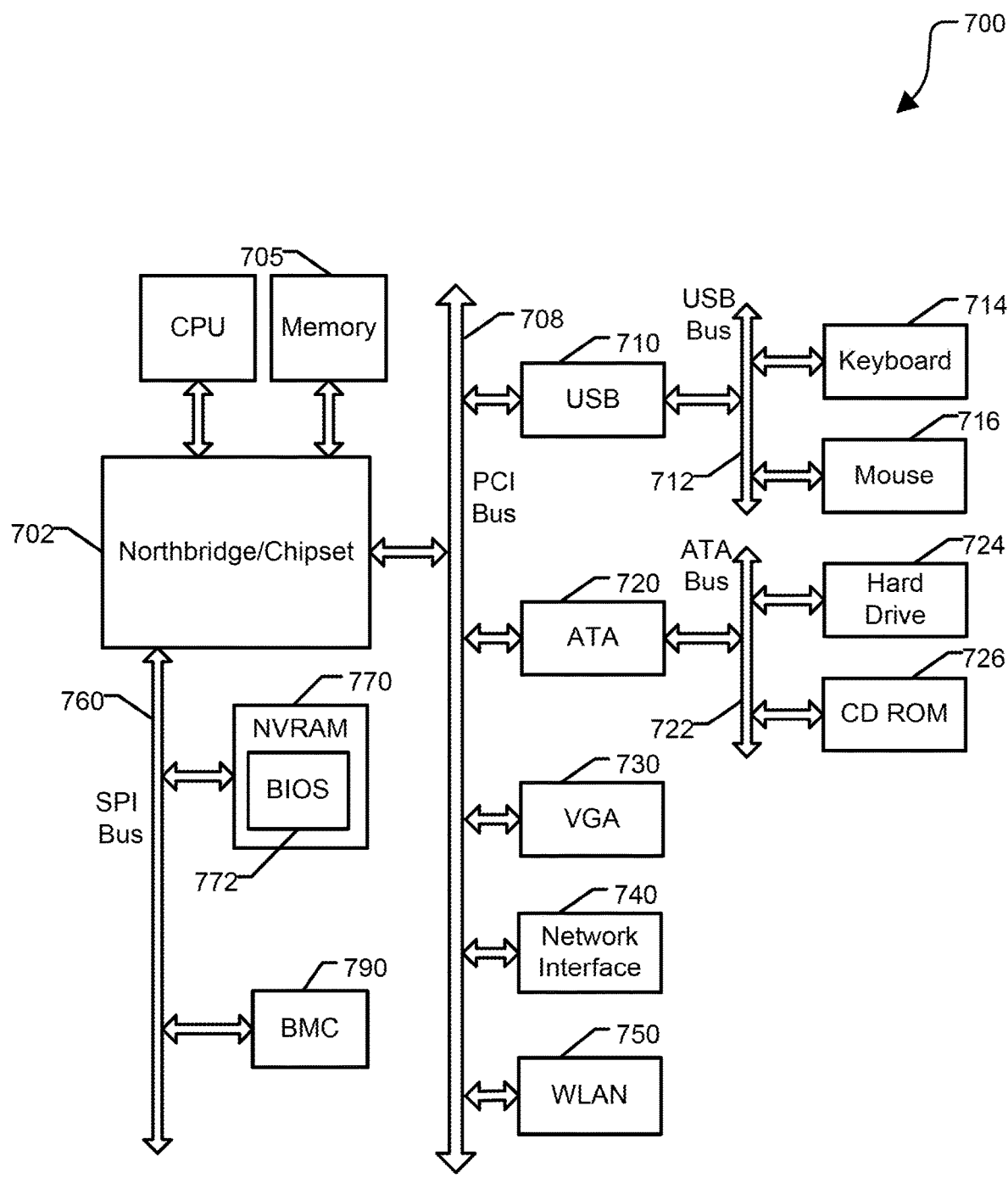
FIG. 7 is a block diagram of an information handling system.

FIG. 7 illustrates an information handling system 700 including a processor 702, a memory 704, a northbridge/chipset 706, a PCI bus 708, a universal serial bus (USB) controller 710, a USB 712, a keyboard device controller 714, a mouse device controller 716, an ATA bus controller 720, an ATA bus 722, a hard drive device controller 724, a compact disk read only memory (CD ROM) device controller 726, a video graphics array (VGA) device controller 730, a network interface controller (NIC) 740, a wireless local area network (WLAN) controller 750, a serial peripheral interface (SPI) bus 760, a nonvolatile random access memory (NVRAM) 770 for storing a basic input/output system (BIOS) 772, and a baseboard management controller (BMC) 790. Information handling system 700 can include additional components and additional busses, not shown for clarity. For example, system 700 can include multiple processor cores, audio devices, and the like. While a particular arrangement of bus technologies and interconnections is illustrated for the purpose of example, one of skill will appreciate that the techniques disclosed herein are applicable to other system architectures. System 700 can include multiple CPUs and redundant bus controllers. One or more components can be integrated together. For example, portions of northbridge/chipset 706 can be integrated within CPU 702.

In some embodiments, information handling systems can be joined together by networks to form a networked system of information handling systems. A networked system of information handling systems may consist of a plurality of information handling systems connecting by one or more internal networks. In many embodiments, they belong to an entity such as a corporation or other business entity. Many of the information handling systems of the networked system may communicate with information handling systems outside of the networked system through an external network or networks, such as the Internet. The external network or networks may be untrusted. For protection against attacks, the information handling systems of the networked system may be positioned behind one or more firewalls. In addition, one or more intrusion prevention and detection systems (IPDS) may protect the networked system. AN IPDS may operate to monitor traffic to the networked system, detect malicious activity, log information about any malicious activity, and attempt to stop the malicious activity. For example, an IPDS may take actions such as sending an alarm, dropping malicious packets, resetting connections, or blocking traffic from the offending Internet protocol (IP) addresses.

For purpose of this disclosure information handling system 700 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 700 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 700 can include processing resources for executing machine-executable code, such as CPU 702, a programmable logic array (PLA), an embedded device such as a System-on-a-Chip (SoC), or other control logic hardware. Information handling system 700 can also include one or more computer-readable medium for storing machine-executable code, such as software or data.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer implemented method, the computer having a processor and memory, the method comprising:
   detecting by the computer a threat indicator that provides an indication of an attack against a networked system of information handling systems;
   representing the threat indicator in part by numerical parameters;
   normalizing the numerical parameters;
   adding attributes to the threat indicator, thereby producing an event that represents an element of an attack against the networked system of information handling systems;
   adding attributes to other threat indicators, thereby producing other events;
   calculating one or more measures of association between the event and the other events based upon the normalized numerical parameters, wherein the one or more measures of association between the event and other events include one or more of the following:
   a Kendall's tau between the event and the other events; and
   a conditional entropy between the event and the other events;
   finding an association of the event with another event based upon the one or more measures of association;
   determining possible future attacks on the networked system of information handling systems based upon the association;
   for each possible future attack of the possible future attacks, determining a probability of the possible future attack based upon the one or more measures of association between the event and the other event;
   assessing a risk to the networked system based upon the probabilities of possible future attacks; and
   determining a defense posture for the networked system based upon the risk.

2. The computer implemented method of claim 1, wherein:
the other event provides an indication of another attack, the other attack attributed to a threat actor group; and
the method further comprises attributing the attack to the threat actor group based upon the association.

3. The computer implemented method of claim 2, further comprising calculating a probability that the threat actor group caused the attack according to the formula:

$$LIK(Y^+, Y_r, Y_\tau, Y_h) = \frac{e^{\hat{\beta}(Y^+; Y_r, Y_\tau, Y_h)}}{1 + e^{\hat{\beta}(Y^+; Y_r, Y_\tau, Y_h)}}$$

wherein: $\hat{\beta}$ is an estimator of a statistical relationship between measurements for a threat actor group and similar events in an data repository, $Y^+$ is an event, $Y_r$ is a list of covariance values between Y+ and other events in an event store, $Y_t$ is a list of Kendall's tau values between Y+ and the other events in the event store, and $Y_h$ is a list of conditional entropy values between Y+ and the other events in the event store.

4. The computer implemented method of claim 2, wherein a capability of the threat actor group is added to the threat indicator as an attribute.

5. The computer implemented method of claim 2, wherein the attributing the attack to the threat actor group includes determining that the other event is an extremal 3-tuple for a join of a conditional entropy of the event with the other events, a Kendall's tau of the event with the other events, and a covariance of the event with the other events.

6. The computer implemented method of claim 1, wherein the determining the probability comprises performing a regression analysis on the normalized numerical parameters and the one or more measures of association.

7. The computer implemented method of claim 6, wherein the performing the regression analysis comprises performing a probit regression analysis.

8. The computer implemented method of claim 6, wherein the performing the regression analysis comprises performing a logistic regression analysis.

9. The computer implemented method of claim 1, wherein the determining the probability of the possible future attack comprises:
generating a set of potential actions $\hat{A}$;
receiving an input logistic prediction model $\hat{\beta}$, wherein $\hat{\beta}$ describes a relationship between predictors and a probability that one of the set of potential actions $\hat{A}$ will be taken; and
applying the model $\hat{\beta}$ to values of the predictors, thereby producing propensity scores.

10. The computer implemented method of claim 1, wherein the determining the probability comprises applying a model $\hat{\beta}$ to input values, the input values including the one or more measures of association.

11. A networked system of information handling systems, comprising:
an intrusion protection and detection system to:
detect a threat indicator that provides an indication of an attack against the networked system;
represent the threat indicator in part by numerical parameters;
normalize the numerical parameters;
add attributes to the threat indicator, thereby producing an event that represents an element of an attack against the networked system of information handling systems;
add attributes to other threat indicators, thereby producing other events;
calculate one or more measures of association between the event and the other events;
find an association of the event with another event based upon the one or more measures of association, wherein the one or more measures of association between the event and other events include one or more of the following:
a Kendall's tau between the event and the other events;
a covariance between the event and the other events; and
a conditional entropy between the event and the other events;
determine possible future attacks on the networked system of information handling systems based upon the association;
for each possible future attack of the possible future attacks, determining a probability of the possible future attack based upon the one or more measures of association between the event and the other event;
assess a risk to the networked system based upon the probabilities of possible future attacks; and
determine a defense posture for the networked system based upon the risk.

12. The networked system of information handling systems of claim 11, wherein:
the other event provides an indication of another attack, the other attack attributed to a threat actor group; and
the networked system is further to attribute the attack to the threat actor group based upon the association.

13. The networked system of information handling systems of claim 11, wherein the determining the probability comprises performing a regression analysis on the normalized numerical parameters and the one or more measures of association.

14. The networked system of information handling systems of claim 13, wherein the performing the regression analysis comprises determining a relationship between a log odds ratio of the probability of a possible future attack and predictors, the predictors including the normalized numerical parameters and the one or more measures of association.

15. The networked system of information handling systems of claim 11, wherein the assessing the risk further comprises assessing the risk based upon a defense posture of the networked system and a vulnerability criticality rating of the networked system.

16. A non-transitory computer-readable medium including code for performing a method of analyzing attacks on a networked system of information handling systems, the method comprising:
detecting a threat indicator that provides an indication of an attack against the networked system of information handling systems;
representing the threat indicator in part by numerical parameters;
normalizing the numerical parameters;
adding attributes to the threat indicator, thereby producing an event that represents an element of an attack against the networked system of information handling systems;
adding attributes to other threat indicators, thereby producing other events;
calculating one or more measures of association between the event and the other events based upon the normalized numerical parameters, wherein the one or more measures of association between the event and other events include one or more of the following:

a Kendall's tau between the event and the other events; and a conditional entropy between the event and the other events;

finding an association of the event with another event based upon the one or more measures of association;

determining possible future attacks on the networked system of information handling systems based upon the association;

for each possible future attack of the possible future attacks, determining a probability of the possible future attack based upon the one or more measures of association between the event and the other event;

assessing a risk to the networked system based upon the probabilities of possible future attacks; and determining a defense posture for the networked system based upon the risk.

17. The computer-readable medium of claim 16, wherein:
the other event provides an indication of another attack, the other attack attributed to a threat actor group; and
the method further comprises attributing the attack to the threat actor group based upon the association.

18. The computer-readable medium of claim 17, wherein the determining possible future attacks comprises examining patterns of attack of the threat actor group.

* * * * *